May 7, 1929.　　　　　M. HEIN　　　　　1,711,731
COMBINATION DISHPAN
Filed Oct. 11, 1923
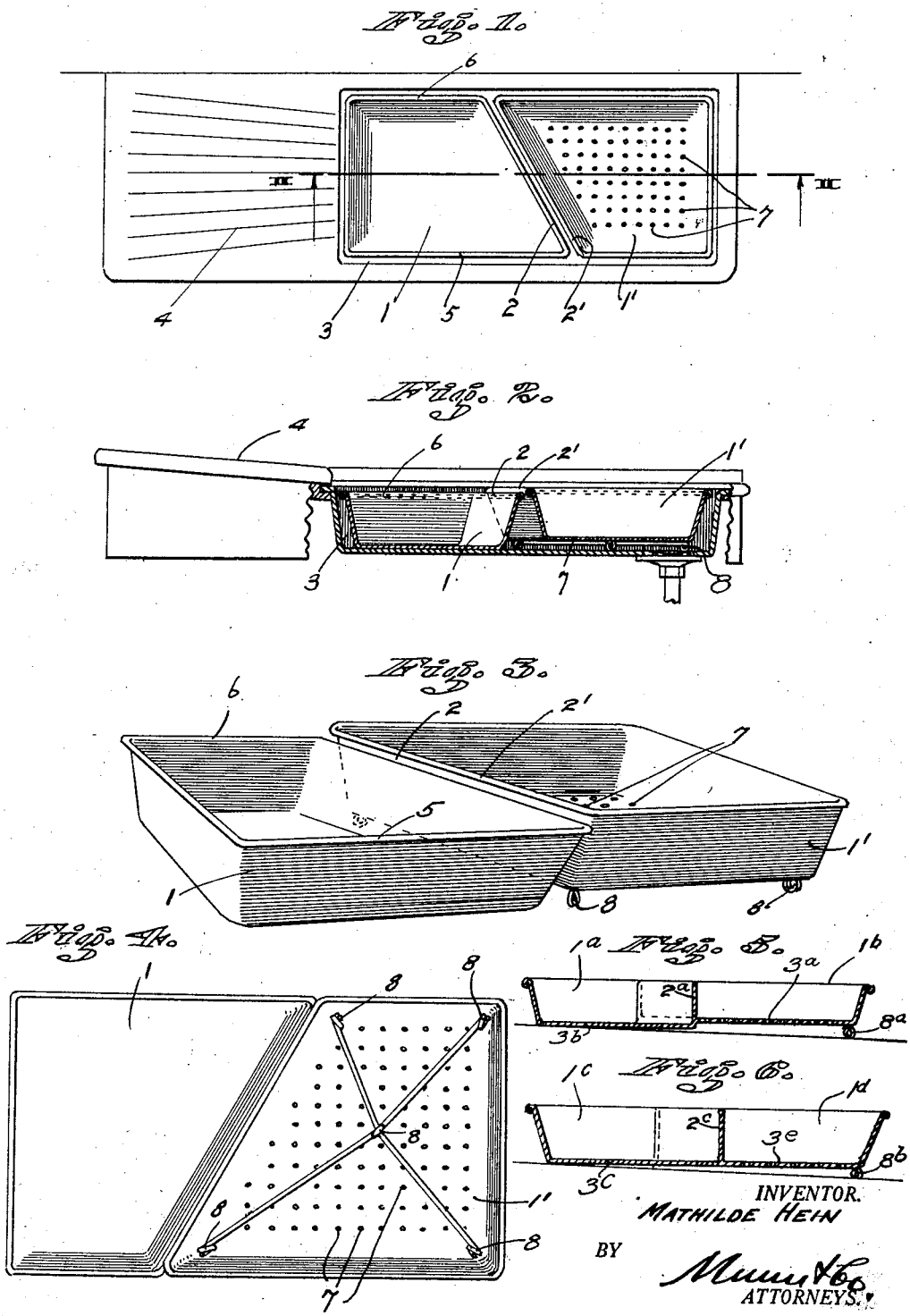
INVENTOR.
MATHILDE HEIN
BY
ATTORNEYS.

Patented May 7, 1929.

1,711,731

UNITED STATES PATENT OFFICE.

MATHILDE HEIN, OF SAN FRANCISCO, CALIFORNIA.

COMBINATION DISHPAN.

Application filed October 11, 1923. Serial No. 667,965.

This invention relates to dish pans as used for the washing and rinsing of dishes, and particularly to such an article with especial reference to apartment house requirements where space is at a premium and anything which will permit more work being done in a given space is of great importance.

My invention has for its principal object a means of using the entire kitchen sink area for combined washing and draining of the dishes instead of a limited portion as at present due to the general use of round or oval dish pans, with the result that fully a third of the sink is unavailable for any useful purpose.

I attain the desired object by the dish pan formed as shown in the drawings hereto and which consists essentially of a rectangular oblong pan of a size to easily fit within the sink, and having a diagonal wall separating it into two portions, one for washing the dishes and the other for draining them.

The draining portion has its bottom at a higher level than the washing portion and is perforated to permit draining of the water to the sink. I make the pan as described either in one piece or in two or secure the two sections together, the principle of operation being the same.

Figure 1 shows the pan formed of two separate portions (1) and (1') having diagonal adjacent walls (2) and (2').

Figure 2 is a sectional elevation of Figure 1 taken along the line 2—2 thereof.

Figure 3 is an enlarged perspective showing the appearance of the pan when made in two pieces; and Figure 4 the bottom view of same.

Figure 5 is a reduced size sectional elevation of the pan as made with both sections secured together in one piece with the "stepped" bottom as shown in the preceding views;

Figure 6 is a similar view of the pan with a flat bottom elevated at one end whereby the function of the stepped bottom is secured in a unitary structure having a bottom in one continuous plane.

The dish pan of the present invention comprises two correspondingly sized sections 1 and 1', each of which is formed of sheet metal and each corresponds in contour to a trapezium, when viewed in plan. The sections are so proportioned in point of external area that their combined areas approximate the capacity of an ordinary kitchen sink when arranged therein one alongside the other and with their sloped or oblique side walls 2 and 2' confronting and in approximate contact, as shown in Figure 1.

The bottom 7 of section 1' is perforated as shown, and suitable risers or legs 8 depend from the corner portions of bottom 7 so that when section 1' is arranged over the drain opening of a sink, bottom 7 is elevated with respect to the bottom of the sink and a clearance provided for the passage of water from section 1' to the drain opening.

The pan shown in Figures 1 to 4 inclusive is formed of separate sections as distinguished from the modified forms shown in Figures 5 and 6. In the modified form shown in Figure 5, sections $1^a$ and $1^b$ are united by a common sloped or oblique wall $2^a$, and the bottom $3^a$ of section $1^b$ is perforated and offset upwardly with respect to the bottom $3^b$ of the adjacent section $1^a$. Risers $8^a$ are disposed at the outer corner portions of the bottom $3^a$ so as to support the device against downward tilting and to ensure a clearance for the passage of drain water from section $1^b$. In Figure 6 the sections $1^c$ and $1^d$ are united by an oblique wall $2^c$. The bottom $3^c$ is common to the sections $1^c$ and $1^d$ and has a perforated portion $3^e$. Risers $8^b$ are provided at the outer corners of the portion $3^c$ so as to elevate the same and provide a clearance for the passage of drain water from section $1^b$.

In the use of the device the sections 1 and 1' are arranged within sink 3 so that the perforated bottom of section 1' is disposed over the drain opening of the sink. The dishes to be washed are placed in section 1. Platters and relatively large dishes are arranged one upon the other adjacent to the longer side wall 5 which is parallel to the opposite side wall 6. This arrangement of the dishes leaves a relatively narrow space adjacent to the side walls 6 for the reception of utensils, such as knives, forks, spoons, etc. In this way the dishes are segregated from the utensils and the presence of the latter in no way interfere with the operation of washing the dishes.

With respect to the arrangement provided for segregating the dishes from the cutlery, etc., it will be observed that the present device has an advantage over the prevailing type of circular dish pan in that the diameter of the bottom of the latter type of pan is ordinarily too short for the length of platters or relatively large dishes. In fact, the circular type of dish pan having a flared side wall requires that the dishes be piled in the central portion of the pan. The circular space between the dishes and the pan which results when the dishes are piled in the center of the pan, is invariably inadequate to accommodate many items of cutlery, spoons, etc. It will be observed that the device of the present invention also permits of arranging the dishes in a pile adjacent to the sloped wall 2 of pan 1, in which event a space will also be provided adjacent to the wall of the pan opposite to the sloped wall 2 to accommodate items of cutlery, etc. Section 1' serves as a receptacle in which the items are arranged to drain as each item is washed in section 1, the construction of section 1' lending itself to accommodate large platters and the like and thus permit segregation to be had between the dishes which are washed and other items when these are placed to drain within section 1.

I claim:

A combined dish and drain pan comprising two sections each having a bottom corresponding in contour to a trapezium and each having flared side walls extending upward from the periphery of the bottom, said sections being adapted for arrangement within a kitchen sink with their sloped side walls parallel and confronting whereby the sections combine to form a rectangular pan conforming to the interior of the sink, each section presenting a receptacle having a portion wherein relatively long dishes may be arranged and another portion wherein other items of tableware may be arranged alongside the dishes, the bottom of one of said sections being imperforate and the bottom of the other section provided with a plurality of perforations and with supporting legs for elevating the said perforated bottom above the bottom of the adjacent section.

MATHILDE HEIN.